Patented Feb. 22, 1927.

1,618,512

UNITED STATES PATENT OFFICE.

FREDERICK H. CHRISTIANSEN, OF HUNTINGTON PARK, CALIFORNIA.

CEMENT MIXTURE.

No Drawing. Application filed April 26, 1922, Serial No. 556,758. Renewed October 22, 1924.

My invention relates to cement mixtures, and more particularly to a combination of ingredients which enables me to use saw dust as a filler. When saw dust is used in its natural state with water and cement, it acts to prevent the cement from "setting" or getting hard. In my pending application, Serial No. 522,144, I have set forth a method of treating the saw dust, and other natural vegetable substance having capillaries, whereby it is capable of use as an efficient filler. In this application I am not proposing to treat the saw dust or other matter separately or in the same manner, but use an additional ingredient which offsets the detrimental effect of the natural saw dust and causes it to mix well as a filler and permits the cement to set or become hard in its usual manner when mixed with water.

I have discovered that by mixing calcium chloride with water, to secure a specific gravity or density of approximately 1.0016, that this water can be used with a mixture of cement and saw dust with the desired result that the saw dust is affected in such manner that it mixes as a filler with the cement, thus producing a mixture which is of special value for coating brick, tile, and the like. The advantages had from the use of saw dust or like matter is that there is less chance for the surface to check or crack, as sometimes happens where cement, or cement and sand have been used together. Color matter of any suitable kind can be mixed therewith so as to provide a face coating for brick and tile in various colors, thus not only making the face of the article coated therewith water proof, but also making it in desired colors for decorative purposes.

I claim:

1. The herein described process of preparing a composition of matter which consists in first mixing water and calcium chloride in proportions to give a specific gravity of substantially 1.0016, then mixing cement and sawdust with said water and calcium chloride mixture, whereby to cause a proper mixing of said sawdust with said cement.

2. The process of preparing a sawdust and cement composition which consists in first mixing water and calcium chloride, and then using said water mixture as the moistening medium and mixing sawdust and cement therewith whereby the water and calcium chloride mixture causes said sawdust to mix with said cement.

Signed at Los Angeles, California, this 21st day of April, 1922.

FREDERICK H. CHRISTIANSEN.